United States Patent
Tsuda

(10) Patent No.: US 9,438,831 B2
(45) Date of Patent: *Sep. 6, 2016

(54) NOISE REDUCTION DEVICE FOR REDUCING NOISE IN IMAGE USING BLACKOUT IMAGE, ELECTRONIC CAMERA, PROGRAM, AND METHOD

(75) Inventor: Yutaka Tsuda, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 1306 days.

This patent is subject to a terminal disclaimer.

(21) Appl. No.: 13/067,968

(22) Filed: Jul. 12, 2011

(65) Prior Publication Data

US 2011/0273595 A1    Nov. 10, 2011

Related U.S. Application Data

(62) Division of application No. 11/133,285, filed on May 20, 2005, now Pat. No. 8,009,207.

(30) Foreign Application Priority Data

May 24, 2004 (JP) .................................. 2004-153422
Jun. 17, 2004 (JP) .................................. 2004-179991

(51) Int. Cl.
H04N 5/217    (2011.01)
H04N 5/365    (2011.01)
H04N 5/361    (2011.01)

(52) U.S. Cl.
CPC .............. *H04N 5/365* (2013.01); *H04N 5/361* (2013.01)

(58) Field of Classification Search
CPC ............................. H04N 5/361; H04N 5/365
See application file for complete search history.

(56) References Cited

U.S. PATENT DOCUMENTS

| 5,926,214 A | 7/1999 | Denyer et al. |
| 5,943,094 A | 8/1999 | Sakai et al. |
| 6,101,284 A | 8/2000 | Matsubara et al. |
| 6,144,408 A * | 11/2000 | MacLean ...................... 348/241 |
| 6,340,989 B1 | 1/2002 | Oda |
| 6,452,633 B1 | 9/2002 | Merrill et al. |
| 7,088,865 B2 | 8/2006 | Ejima et al. |
| 7,136,100 B1 | 11/2006 | Kato et al. |

(Continued)

FOREIGN PATENT DOCUMENTS

| EP | 0 859 509 A2 | 8/1998 |
| EP | 1 083 740 A2 | 3/2001 |

(Continued)

OTHER PUBLICATIONS

Office Action dated Dec. 11, 2009 issued in U.S. Appl. No. 11/133,285.

(Continued)

*Primary Examiner* — Nhon Diep
(74) *Attorney, Agent, or Firm* — Oliff PLC

(57) ABSTRACT

The noise reduction device includes an image storage unit, a blackout image processing unit, and a noise processing unit. The image storage unit captures image data obtained by imaging a field with an image sensor, and stores the image data therein. The blackout image processing unit captures blackout image data obtained by imaging by the image sensor that is shaded, and extracts a specific noise component of the blackout image data. The noise processing unit reduces a noise in the image data based on the specific noise component of the blackout image data.

10 Claims, 7 Drawing Sheets

(56) References Cited

U.S. PATENT DOCUMENTS

| | | | |
|---|---|---|---|
| 7,349,574 | B1 | 3/2008 | Sodini et al. |
| 2002/0008766 | A1 | 1/2002 | Tariki |
| 2003/0151673 | A1 | 8/2003 | Hashimoto et al. |
| 2004/0135922 | A1 | 7/2004 | Nakajima et al. |
| 2007/0035643 | A1 | 2/2007 | Hashimoto et al. |

FOREIGN PATENT DOCUMENTS

| | | |
|---|---|---|
| GB | 2 317 522 A | 3/1998 |
| JP | A-2000-125204 | 4/2000 |
| JP | A-2001-57656 | 2/2001 |
| JP | A-2002-281390 | 9/2002 |
| JP | A-2003-51991 | 2/2003 |
| JP | A-2003-101887 | 4/2003 |
| JP | A-2003-333435 | 11/2003 |
| JP | A-2003-348536 | 12/2003 |
| WO | WO 99/62023 A1 | 12/1999 |

OTHER PUBLICATIONS

Office Action dated Oct. 8, 2010 issued in U.S. Appl. No. 11/133,285.

Notice of Allowance dated Apr. 12, 2011 issued in U.S. Appl. No. 11/133,285.

Supplemental Notice of Allowance dated Apr. 26, 2011 issued in U.S. Appl. No. 11/133,285.

* cited by examiner

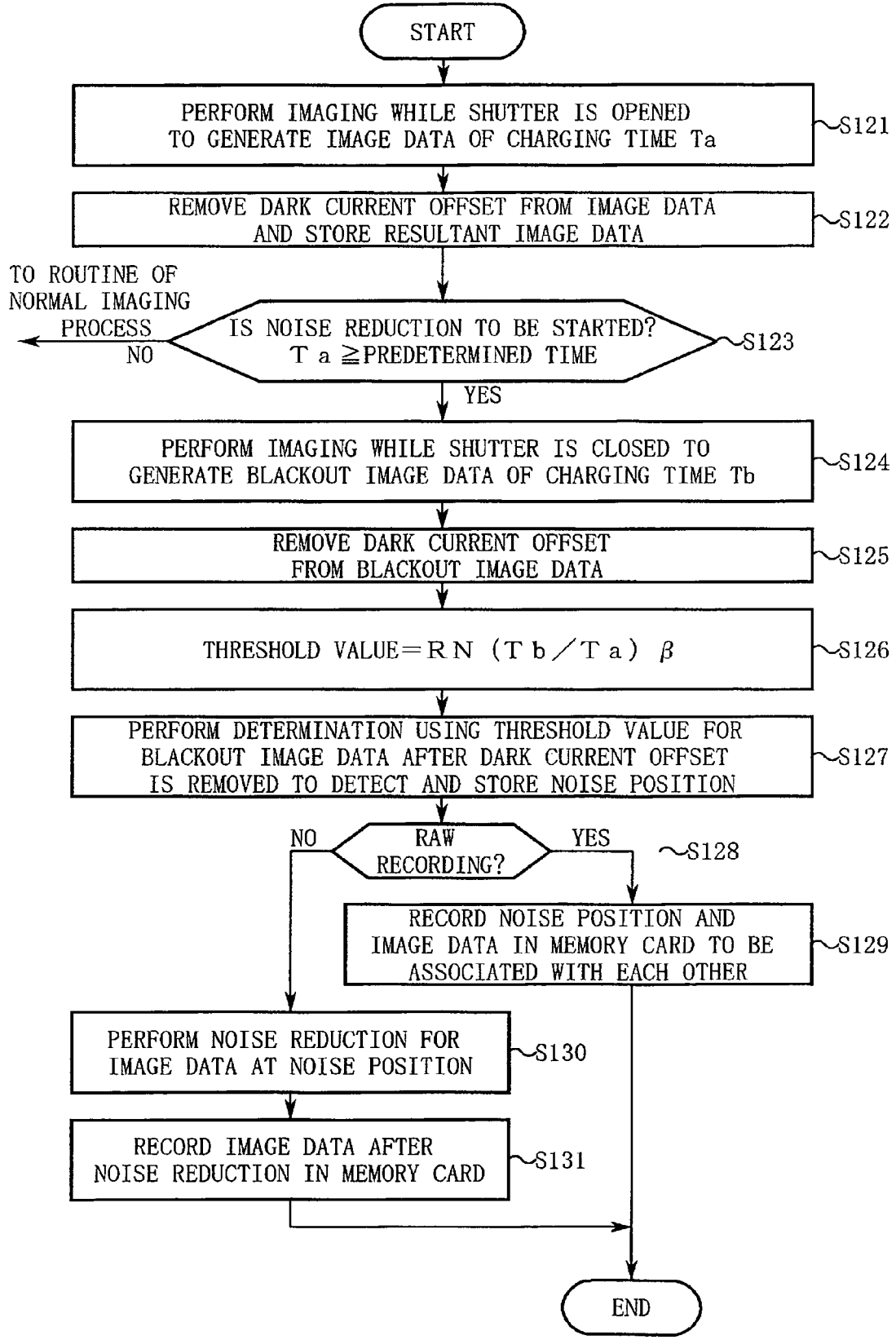

NOISE REDUCTION DEVICE FOR REDUCING NOISE IN IMAGE USING BLACKOUT IMAGE, ELECTRONIC CAMERA, PROGRAM, AND METHOD

CROSS-REFERENCE TO RELATED APPLICATIONS

This is a Division of application Ser. No. 11/133,285, filed May 20, 2005. The disclosure of the prior application is hereby incorporated by reference herein in its entirety.

BACKGROUND OF THE INVENTION

1. Field of the Invention

The present invention relates to a noise reduction device and a noise reduction method that reduce a noise in image data by using a blackout image that is taken while an image sensor is shaded.

The present invention also relates to an electronic camera incorporating the noise reduction device.

The present invention also relates to a program that makes a computer operate as the noise reduction device.

2. Description of the Related Art

In general, a fixed pattern noise appears in image data when the image data is taken by an electronic camera during long exposure.

Japanese Unexamined Patent Application Publication No. 2000-125204 (see claims 1 and 2, for example) discloses a device for removing the above fixed pattern noise. In this conventional device, image data taken in a normal manner and blackout image data taken while a shutter of the electronic camera is closed are prepared first. This conventional device subtracts the blackout image data from the normally taken image data, thereby removing the fixed pattern noise in a common mode.

However, the blackout image data taken during long exposure includes a random noise, in addition to the fixed pattern noise. The random noise is added in a reversed mode to the normally taken image data in the aforementioned subtraction by the conventional device. Thus, there is a problem in that the random noise in the image data is increased.

Moreover, it is necessary to make charging time of the normally taken image data and charging time of the blackout image data equal to each other in the conventional device in order to make the fixed pattern noises in both the normally taken image data and the blackout image data equal to each other. Thus, in a case of a 10-minute exposure, for example, it takes further 10 minutes to obtain the blackout image data. During that period, shooting by the electronic camera cannot be performed. Thus, a valuable opportunity for a photograph may be missed.

Furthermore, memory consumption is increased in the conventional device because the blackout image data is temporarily stored in a memory.

SUMMARY OF THE INVENTION

It is an object of the present invention to provide a technique for suppressing increase of a random noise in a process for removing a noise caused by long exposure.

The present invention is now described.

(1) A noise reduction device of the present invention includes an image storage unit, a blackout image processing unit, and a noise processing unit.

The image storage unit captures image data obtained by imaging a field with an image sensor and stores the image data therein.

The blackout image processing unit captures blackout image data obtained by performing the imaging with the image sensor being shaded, and extracts a specific noise component of the blackout image data.

The noise processing unit reduces a noise in the image data based on the specific noise component of the blackout image data.

(2) It is preferable that the blackout image processing unit extract a value equal to or larger than a predetermined value from the blackout image data to use the value as the specific noise component.

(3) It is preferable that charging time of the blackout image data during imaging be shorter than charging time of the image data during imaging.

(4) It is preferable that the blackout image processing unit include a level selection unit and a variation suppressing unit.

The level selection unit selects, as a low-level pixel, a pixel having a low level that is equal to or smaller than a predetermined threshold value from the blackout image data.

The variation suppressing unit suppresses a high spatial frequency component for the selected low-level pixel to obtain the specific noise component.

(5) It is preferable that the blackout image processing unit suppress a high spatial frequency component of the blackout image data to obtain the specific noise component. The noise processing unit subtracts a value corresponding to the specific noise component from the image data to reduce the noise in the image data.

(6) It is preferable that the blackout image processing unit perform smoothing for the blackout image data by using a nearby pixel for which a maximum value is limited, to obtain the specific noise component.

(7) It is preferable that charging time of the blackout image data during imaging be shorter than charging time of the image data during imaging. The noise processing unit amplifies the blackout image data to compensate lowering of a level of a fixed pattern noise caused by shortening of the charging time of the blackout image data. The noise processing unit subtracts the blackout image data after the compensation from the image data to reduce the noise in the image data.

(8) It is preferable that the blackout image processing unit remove an increase in level caused by a dark current (a dark current offset) from the blackout image data to obtain the specific noise component.

(9) It is preferable that the blackout image processing unit discriminate, based on a signal level, the dark current offset from the fixed pattern noise in the blackout image data to obtain the specific noise component containing the fixed pattern noise.

(10) It is preferable that the blackout image processing unit extract a value equal to or larger than a predetermined value from the blackout image data as the specific noise component.

The noise processing unit includes a noise detection unit and a noise reduction unit. The noise detection unit detects, as a noise position, a position at which the specific noise component exceeds a predetermined threshold value. The noise reduction unit applies the noise position to the image data to specify a noise pixel corresponding to the noise position. The noise reduction unit replaces a value of the noise pixel with a value corresponding to a nearby pixel that is located near the noise pixel to achieve noise reduction.

(11) It is preferable that charging time of the blackout image data during imaging be shorter than charging time of the image data during imaging. The noise detection unit sets the threshold value to be lower in accordance with a shortening ratio of the charging time of the blackout image data. Thus, the noise detection unit estimates the noise position, at which the noise becomes visible when the charging time of the blackout image data is extended, from the blackout image data having the shortened charging time.

(12) It is preferable that charging time of the blackout image data during imaging be shorter than charging time of the image data during imaging. The noise detection unit amplifies a signal level of the blackout image data in accordance with a shortening ratio of the charging time of the blackout image data to imitate a noise that appears when the charging time of the blackout image data is extended. The noise detection unit performs determination using the threshold value for the amplified blackout image data to estimate the noise position.

(13) It is preferable that the noise detection unit amplify the signal level of the blackout image data after subtracting the dark current offset from the blackout image data.

(14) An electronic camera of the present invention includes: the aforementioned noise reduction device described in (1); an image sensor; a shading mechanism shading the image sensor; and a control unit controlling the image sensor to generate the image data of the field and driving the shading mechanism to shade the image sensor and generate the blackout image data.

(15) A noise reduction program of the present invention makes a computer operate as the image storage unit, the blackout image processing unit, and the noise processing unit that are described in (1).

(16) A noise reduction method of the present invention includes the steps of: capturing image data obtained by imaging a field with an image sensor and storing the image data; capturing blackout image data obtained by performing the imaging with the image sensor being shaded and extracting a specific noise component of the blackout image data; and reducing a noise in the image data based on the specific noise component of the blackout image data.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 7 is a flowchart of a noise reduction process of the electronic camera 131.

DETAILED DESCRIPTION OF THE PREFERRED EMBODIMENTS

Hereinafter, embodiments of the invention will be described with reference to the accompanying drawings.

Embodiment 1

Configuration of Embodiment 1

Figure 1:
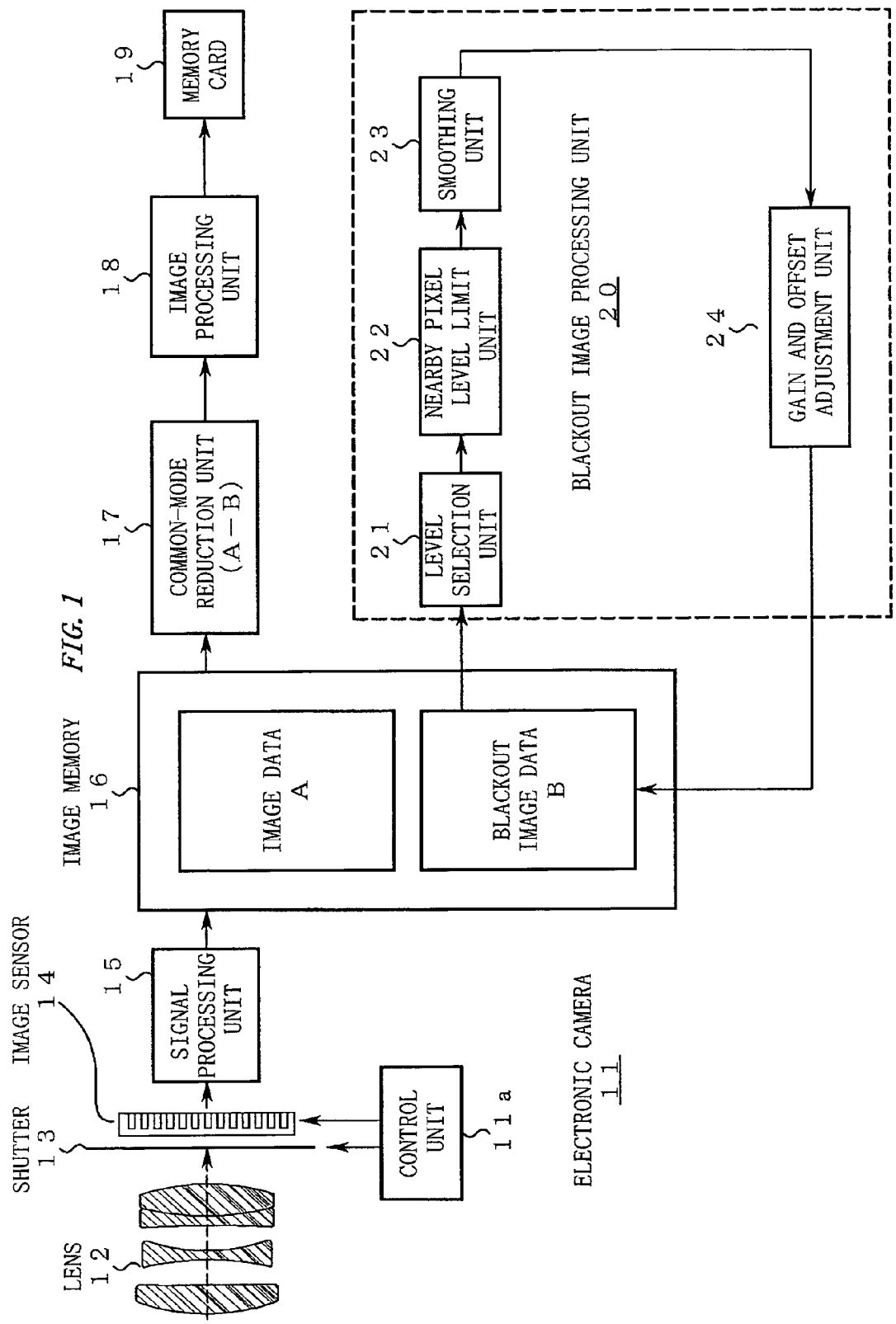
FIG. 1 is a block diagram showing the configuration of an electronic camera 11 according to a first embodiment of the present invention.

FIG. 1 is a block diagram showing the configuration of an electronic camera 11 according to a first embodiment of the present invention.

Referring to FIG. 1, a lens 12 is mounted onto the electronic camera 11. A shutter 13 and an image sensor 14 are arranged in an image space of the lens 12. The shutter 13 and the image sensor 14 are controlled by a control unit 11a.

An image output signal of the image sensor 14 is subjected to a digitalizing process and the like in a signal processing unit 15 and is then stored in an image memory 16 temporarily. The image memory 16 has a storage area for storing image data A that is data of a normally taken image and a storage area for storing blackout image data B that is data of a blackout image taken while the shutter 13 is closed.

A blackout image processing unit 20 processes the blackout image data B. The blackout image processing unit 20 includes the following components:

(1) a level selection unit 21 for determining a level of blackout image data B and selecting a pixel having a low level as a low-level pixel;

(2) a nearby pixel level limit unit 22 for reading out a nearby pixel of the low-level pixel and limiting the maximum value of a signal level of the read nearby pixel;

(3) a smoothing unit 23 for performing smoothing for the low-level pixel by using the nearby pixel for which the maximum value has been limited; and (4) a gain and offset adjustment unit 24 for adjusting a gain and an offset of the blackout image data in order to compensate shortening of charging time Tb of the blackout image data.

A common-mode reduction unit 17 subtracts the processed blackout image data B from the image data A pixel by pixel, thereby reducing a fixed pattern noise and a dark current offset in a common mode. The image data after the subtraction is subjected to compression and the like in an image processing unit 18, and is then recorded and stored in a memory card 19.

Operation in Embodiment 1

Figure 2:
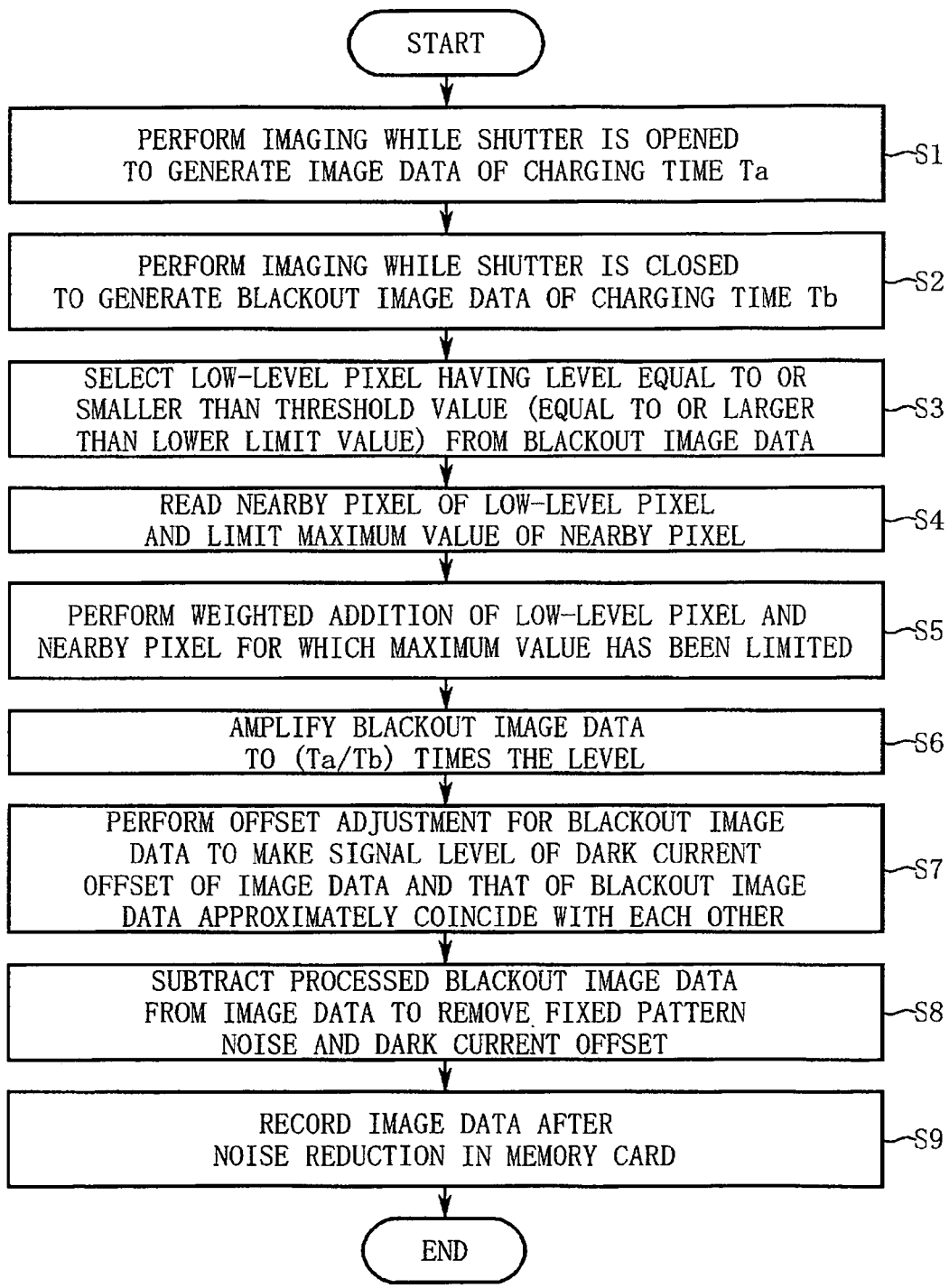
FIG. 2 is a flowchart of a noise reduction process of the electronic camera 11.

FIG. 2 is a flowchart of a process for removing the fixed pattern noise in the electronic camera 11.

This process is now described with reference to steps in FIG. 2.

Step S1: The control unit 11a opens the shutter 13 in response to a release operation by a user and forms an image of a subject obtained through the lens 12 on an imaging area of the image sensor 14. In this state, the control unit 11a makes the image sensor 14 generate image data A having charging time Ta.

The image sensor 14 outputs the image data A in accordance with a driving pulse supplied from the control unit 11a. The output image data A is supplied to the image memory 16 through the signal processing unit 15 and is temporarily stored in the image memory 16.

Step S2: The control unit 11a determines charging time Tb for storing electric charges of blackout image data B based on the charging time Ta and the temperature. The charging time Tb is "a lower limit" of a range in which the charging time Ta is approximately proportional to occurrence (level) of the fixed pattern noise, and is obtained in advance by way of experiment.

Immediately after the generation of the image data A, the control unit 11a closes the shutter 13. The control unit 11a then makes the image sensor 14 generate the blackout image data B having the charging time Tb while keeping a light-blocking state in which the closed shutter 13 blocks light.

The image sensor 14 outputs the generated blackout image data B in accordance with a driving pulse supplied from the control unit 11a. The output blackout image data B is supplied to the image memory 16 through the signal processing unit 15 and is temporarily stored in the image memory 16.

Step S3: The level selection unit 21 reads out the blackout image data B from the image memory 16 pixel by pixel, and selects a pixel having a level that is equal to or smaller than a threshold value as a low-level pixel.

It is preferable that the threshold value be determined in the following manner, for example. First, a lower limit of level variation of the fixed pattern noise and an upper limit of level variation of a random noise are experimentally obtained for data of a plurality of blackout images. Then, an intermediate value between the lower limit and the upper limit is obtained. The thus obtained intermediate value is used as the threshold value in the selection of the low-level pixel.

Moreover, it is preferable that a plurality of threshold values be experimentally determined for a plurality of different conditions in which imaging sensitivity and/or temperature are/is different, respectively. In this case, it is also preferable that the electronic camera 11 detect a condition of the sensitivity and/or the temperature during imaging and select one of the threshold values in accordance with the detected condition.

As a result of the above level selection, a position at which a noise of a low level (that is probably a random noise) occurs is extracted as the low-level pixel, except for a position at which the fixed pattern noise occurs.

Due to the above level selection, it is possible to reduce the number of pixels that are subjected to smoothing that will be described later. Thus, the entire processing cost and the entire processing time can be reduced.

A pixel having a level that is smaller than a predetermined lower limit value may be omitted from the selection of the low-level pixel. This is because an extremely low level means nothing even if that level is subtracted from the image data. The predetermined lower limit value in this case can be determined by experimentally confirming that the random noise in the image data A does not increase after the noise reduction.

Step S4: The nearby pixel level limit unit 22 refers to nearby pixels that are located near the selected low-level pixel in the blackout image data B. A range in which the nearby pixels are referred to can be set to be equal to or larger than a period of the random noise. For example, that range can be a range of 3×3 pixels.

The nearby pixel level limit unit 22 limits the maximum value of each nearby pixel. This limitation can remove the fixed pattern noise, which locally sticks out, from the nearby pixel in a simple manner.

For example, this limitation may be achieved by replacing a large value of a nearby pixel with a value of another nearby pixel that is equal to or smaller than that large value.

Alternatively, a value of each nearby pixel may be limited to be equal to or smeller than a predetermined maximum value (e.g., the threshold value used in the selection of the low-level pixel in Step S3), for example.

Alternatively, a nearby pixel having a level that exceeds a predetermined maximum value (e.g., the threshold value used in the selection of the low-level pixel in Step S3) may be removed from a range that is referred to in a smoothing process performed in Step S5 described later, for example.

Alternatively, the maximum value of the nearby pixel may be limited in such a manner that a difference between the low-level pixel and the nearby pixel falls within a certain value.

Step S5: The smoothing unit 23 performs weighted addition of the nearby pixel for which the maximum value is limited in the nearby pixel level limit unit 22 and the low-level pixel, and performs a digital filtering process. For example, all weights may be one.

Instead of the weighted addition, a median value may be calculated from the nearby pixels and the low-level pixel, and the low-level pixel may be replaced with the median value.

As a result of the smoothing, a high spatial frequency component, i.e., a random noise of the low-level pixel is suppressed. Thus, a value of the low-level pixel after the smoothing represents a dark current offset in a low frequency region precisely.

Step S6: The gain and offset adjustment unit 24 amplifies the signal level of the blackout image data B for which the smoothing unit 23 has completed the smoothing to (Ta/Tb) times the level.

In the case where a relationship between the charging time and the fixed pattern noise is nonlinear, it is preferable to obtain a function f and a coefficient $\alpha$ for compensating the nonlinear relationship in advance by way of experiment and to amplify the signal level of the blackout image data B to f(Ta/Tb) times or (Ta/Tb)·$\alpha$ times the level.

Step S7: The gain and offset adjustment unit 24 then performs offset adjustment for the signal level of the blackout image data B in such a manner that a signal level of a dark current offset of the "amplified blackout image data B" and that of the "image data A" are approximately coincident with each other. For example, the dark current offset of the image data A is calculated by obtaining a difference between a zero level and an output level of an OB region (shaded region outside an effective area) of the image sensor.

The blackout image data B processed in the aforementioned manner is stored again in the image memory 16.

Step S8: After the aforementioned processing of the blackout image data B, the common-mode reduction unit 17 subtracts the blackout image data B from the image data A pixel by pixel. This subtraction removes the fixed pattern noise and the dark current offset from the image data A in a common mode.

Step S9: The image data A processed by the common-mode reduction unit 17 is supplied to the image processing unit 18. The image processing unit 18 performs processes of white balance adjustment, color interpolation, image compression, and the like for the image data A. After those processes, the image data A is recorded and stored in the memory card 19.

In the first embodiment, the level of the dark current offset of the image data A and that of the blackout image data B are made approximately the same and thereafter the blackout image data B is subtracted from the image data A. However, the present invention is not limited thereto. For example, subtraction of the dark current offset may be performed for each of the image data A and the blackout image data B, and thereafter the blackout image data B may be subtracted from the image data A.

Principle of Embodiment 1

Main features of the first embodiment are now listed, and the principle of the first embodiment is described for each feature.
(Feature 1)
In the first embodiment, data of a blackout image that is taken while the shutter is closed is taken in. The blackout image data does not contain intrinsic information of an image, but mainly contains the following three noises.
(1) Fixed pattern noise
(2) Random noise
(3) Dark current offset
The fixed pattern noise is a noise causing a fixed pattern to appear on an image and increases in approximately proportion to charging time.
The random noise appears at random on an image. An offset of the random noise corresponds to the dark current offset and raises a black level of image data in accordance with accumulation of a dark current or the like. The dark current offset has a lower spatial frequency component, as compared with the random noise. A level of the dark current offset increases with the charging time. However, the increase in level of the dark current offset is remarkably smaller than the increase in level of the fixed pattern noise.
Therefore, with the increase of the charging time, the signal level of the fixed pattern noise moves farther away from signal levels of other noises. Thus, a threshold value is set between the signal level of the fixed patter noise and the signal levels of the other noises. The use of such a threshold value makes it possible to discriminate "the fixed pattern noise having the level that goes up locally" from "the random noise and the dark current offset that have uniform variation over the image and have low levels".
Accordingly, in the first embodiment, a low-level pixel having a level that is equal to or smaller than the predetermined threshold value is selected from the blackout image data first. The thus selected low-level pixel mainly contains the random noise and the dark current offset.
The level of the random noise varies at random pixel by pixel. Therefore, the random noise is a high spatial frequency component. Thus, in the first embodiment, the high spatial frequency component in an image space (screen) is suppressed for the low-level pixel. This suppression removes the random noise in a high frequency region preferentially. As a result of the suppression, a signal value of the low-level pixel represents the dark current offset in a low frequency region highly precisely.
On the other hand, a pixel that is not selected as the low-level pixel (hereinafter, simply referred to as a "high-level pixel") is not subjected to the process for suppressing the high spatial frequency component. Thus, a signal value of the high-level pixel mainly represents the fixed pattern noise.
In the first embodiment, the blackout image data processed in the aforementioned manner is subtracted from data of an image that is taken in a normal manner. Since the random noise in a region of low-level pixels has been already removed from the blackout image data, a problem that the random noise is added to the image data in a reversed mode does not occur, unlike the conventional technique. Thus, the random noise hardly increases in the image data after the subtraction.

Moreover, the fixed pattern noise that is represented by the high-level pixel is subtracted from the image data without being affected by the suppression of the high spatial frequency component. Thus, the fixed pattern noise caused by long exposure can be precisely removed.
(Feature 2)
In the first embodiment, a pixel having a level in a range from a predetermined lower limit value to the threshold value is selected as the low-level pixel. For a pixel having a level that is smaller than the predetermined lower limit value, a level of the random noise is small because the signal level is small. Therefore, even if such a pixel is omitted from the processing of the random noise, increase of the random noise in a finally obtained image can be ignored. In addition, the number of the low-level pixels is reduced due to the selection of the low-level pixels. Thus, the processing cost of the smoothing can also be reduced.
(Feature 3)
In the first embodiment, the smoothing using nearby pixels is performed for the low-level pixel, thereby suppressing the high spatial frequency component of the low-level pixel. This smoothing limits the maximum value of the nearby pixel to simply remove the fixed pattern noise of the nearby pixel.
Therefore, it is possible to prevent a situation where the smoothing causes the fixed pattern noise of the nearby pixel to be mixed into the low-level pixel from occurring.
Accordingly, the low-level pixel after the smoothing is hardly affected by the fixed pattern noise, but represents a value of the dark current offset highly precisely.
The thus processed blackout image data is then subtracted from the image data. As a result, the dark current offset in the image data can be precisely canceled, and the image data in which the black level is reproduced faithfully can be obtained.
(Feature 4)
In the first embodiment, the charging time of the blackout image data during imaging is shortened. In order to compensate the shortening of the charging time, the blackout image data is amplified. In that amplification, the random noise in the blackout image data increases in proportion to the amplification. Therefore, in the case where the shortening of the charging time of the blackout image data is performed in the conventional technique without careful consideration, the random noise in the image data remarkably increases.
On the contrary, the random noise in the blackout image data is reduced carefully in the first embodiment. Thus, even when the amplification of the blackout image data is performed, the random noise in the blackout image data can be kept to be small. Therefore, even if the charging time of the blackout image data is shortened, the random noise in the finally obtained image hardly increases.
This enables further shortening of the charging time of the blackout image data in the electronic camera. Consequently, the electronic camera can be set free from a process for imaging the blackout image more quickly, and the usability of the electronic camera can be improved.

Advantages of Embodiment 1 and Others

Next, advantages obtained by combining the above features and the like are described.
As described above, the low-level pixel is selected from the blackout image data B and is then subjected to smoothing in the first embodiment. Therefore, the random noise in the low-level pixel of the blackout image data B can be strongly suppressed.

Moreover, the maximum value of the nearby pixel that is referred to in the smoothing is limited in the first embodiment. Thus, it is possible to prevent a situation where the smoothing causes the fixed pattern noise to be mixed into the low-level pixel from occurring.

Those processes performed for the low-level pixel can remove the random noise in the low-level pixel. That is, the thus processed low-level pixel represents the dark current offset precisely. On the other hand, the level of the fixed pattern noise, which goes up locally, is higher than that of the random noise. Therefore, a pixel other than the low-level pixel (i.e., high-level pixel) represents the fixed pattern noise faithfully.

The thus processed blackout image data B is subtracted from the image data A, thereby the fixed pattern noise and the dark current offset are precisely removed from the image data A after the subtraction. On the other hand, the random noise hardly increases in the image data A after the subtraction, because the random noise in the blackout image data B is strongly removed. As a result, a good-quality image containing few noises can be finally obtained.

Moreover, the low-level pixel is selected in the first embodiment. In addition, a pixel having an extremely low level is omitted from the selection of the low-level pixel. Thus, the number of pixels that are subjected to the smoothing can be reduced. This can efficiently reduce the processing cost of noise reduction.

Furthermore, in the first embodiment the charging time Tb of the blackout image data is shortened within a range in which the charging time is approximately proportional to the signal level of the fixed pattern noise. Thus, a time period during which the electronic camera 11 is occupied by imaging of the blackout image data can be shortened. This improves the usability of the electronic camera 11.

Next, another embodiment of the present invention is described.

Embodiment 2

Configuration of Embodiment 2

Figure 3:
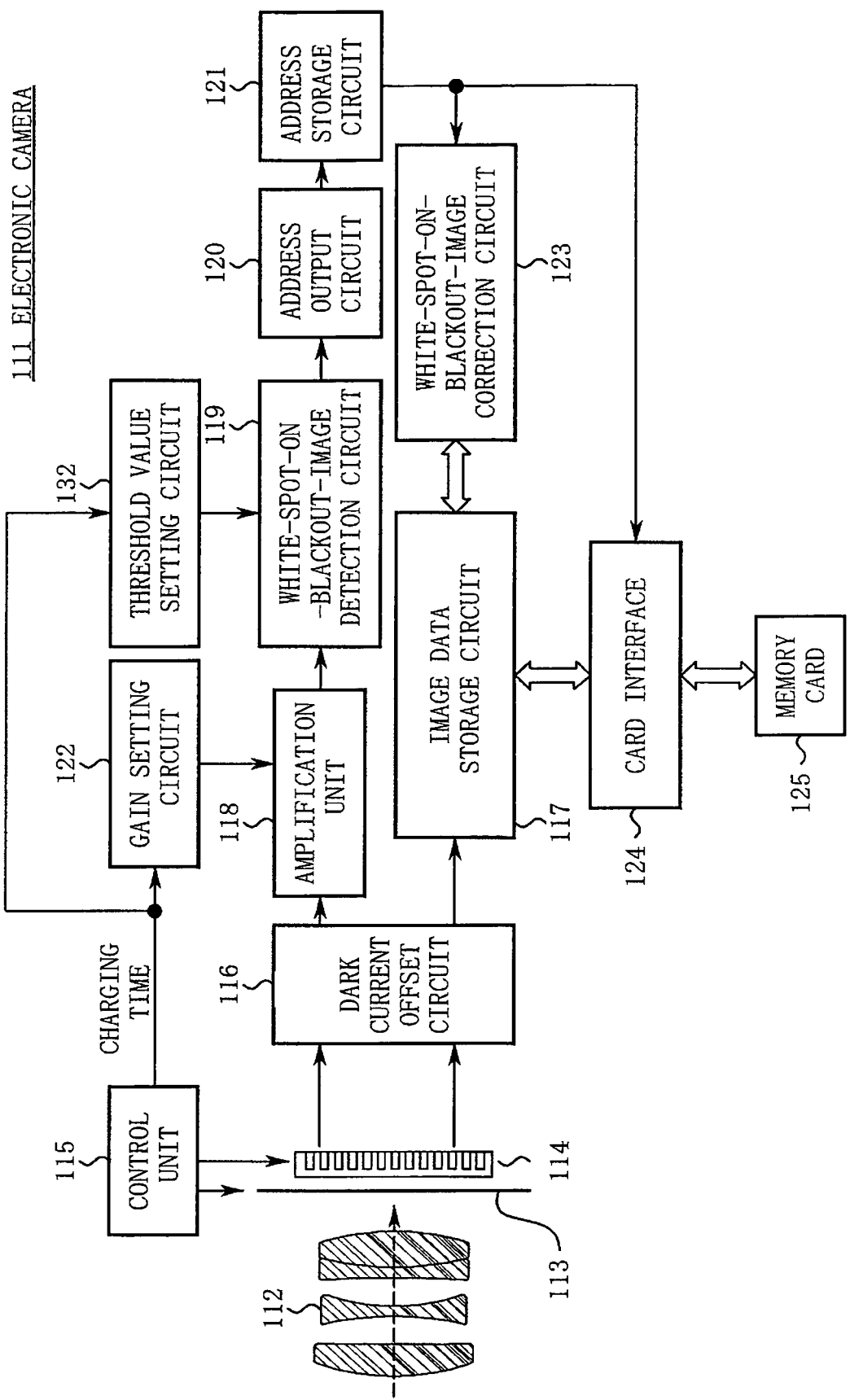
FIG. 3 is a block diagram showing the configuration of an electronic camera 111 according to a second embodiment of the present invention.

FIG. 3 is a block diagram showing the configuration of an electronic camera 111 according to a second embodiment of the present invention.

A lens 112 is mounted on the electronic camera 111. A shutter 113 and an image sensor 114 are arranged in an image space of the lens 112. The shutter 113 and the image sensor 114 are controlled by a control unit 115.

Image data output from the image sensor 114 is input to an image data storage circuit 117 through a dark current offset circuit 116, and is recorded in the image data storage circuit 117.

Blackout image data (described later) output from the image sensor 114 is supplied to an amplification unit 118 through the dark current offset circuit 116. A gain setting circuit 122 adjusts a gain of the amplification unit 118. A white-spot-on-blackout-image detection circuit 119 performs determination using a threshold value for an output of the amplification unit 118 to extract a fixed pattern noise that exceeds the threshold value. The threshold value of the white-spot-on-blackout-image detection circuit 119 is adjusted by a threshold value setting circuit 132. An address output circuit 120 converts a position of the extracted noise into a coordinate on a display screen (address information) and outputs the coordinate. An address storage circuit 121 temporarily stores the coordinate output from the address output circuit 120. A white-spot-on-blackout-image correction circuit 123 locally performs noise reduction for the image data in the image data storage circuit 117 in accordance with the noise position acquired from the address storage circuit 121. A card interface 124 records and stores the image data, the noise position, and the like in a memory card 125.

[Noise Reduction Operation]

Figure 4:
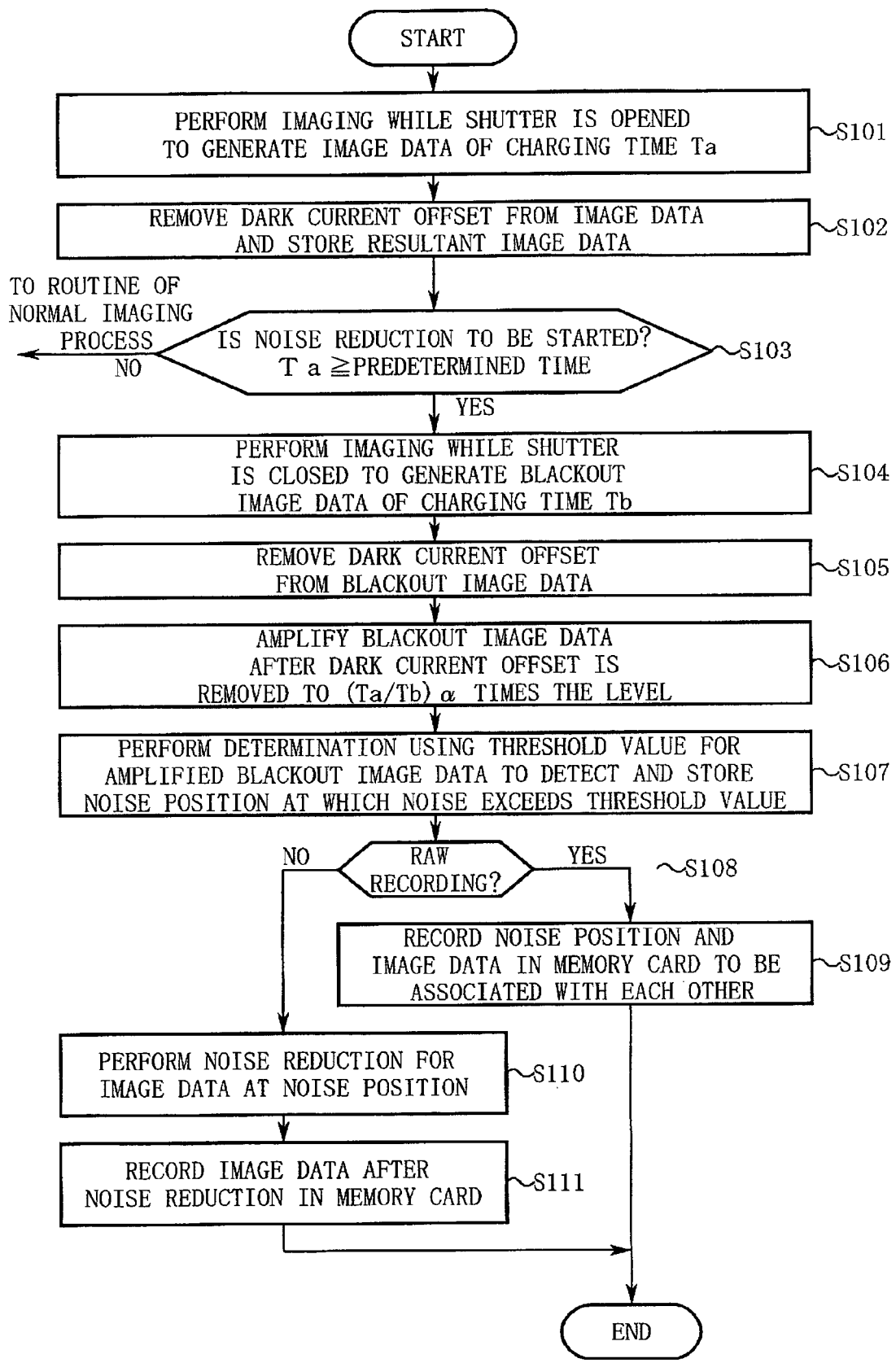
FIG. 4 is a flowchart of a noise reduction process of the electronic camera 111.

FIG. 4 is a flowchart of a noise reduction process in the electronic camera 111.

FIGS. 5A to 5D show how to process the blackout image data.

This noise reduction process is now described, referring to steps in FIG. 4.

Step S101: The control unit 115 opens the shutter 113 in response to a release operation by a user, thereby forming a subject image taken through the lens 112 on an imaging area of the image sensor 114. In this state, the control unit 115 makes the image sensor 114 perform photoelectric conversion and charge storage, thereby generating image data having charging time Ta. The image sensor 114 outputs that image data in an order of scanning on the display screen.

Step S102: The dark current offset circuit 116 detects increase of a signal level of that image data caused by a dark current from values of OB pixels (shaded dummy pixels provided in a surrounding area of an effective area) contained in that image data, thereby obtaining a dark current offset. The dark current offset circuit 116 subtracts the dark current offset from the image data to suppress looming of a black level caused by long exposure. The thus processed image data is temporarily stored in the image data storage circuit 117.

Step S103: The control unit 115 determines based on the charging time Ta whether or not a noise caused by long exposure is to be removed.

In the case where the charging time Ta is shorter than a predetermined time and it is determined that the fixed pattern noise can be ignored, a routine of a normal imaging process is executed.

On the other hand, in the case where the charging time Ta is longer than the predetermined time and it is determined that the fixed pattern noise cannot be ignored, the operation is moved to Step S104 and subsequent steps in order to achieve noise reduction.

Step S104: The control unit 115 determines charging time Tb based on the charging time Ta and the temperature. The charging time Tb is "a lower limit" of a range in which the charging time Ta is approximately proportional to occurrence of the fixed pattern noise, and is obtained by way of experiment.

The control unit 115 then makes the image sensor 114 store electric charges while closing the shutter 113 and keeping a state where light is blocked by the closed shutter 113, thereby generating blackout image data of the charging time Tb.

Figure 5:
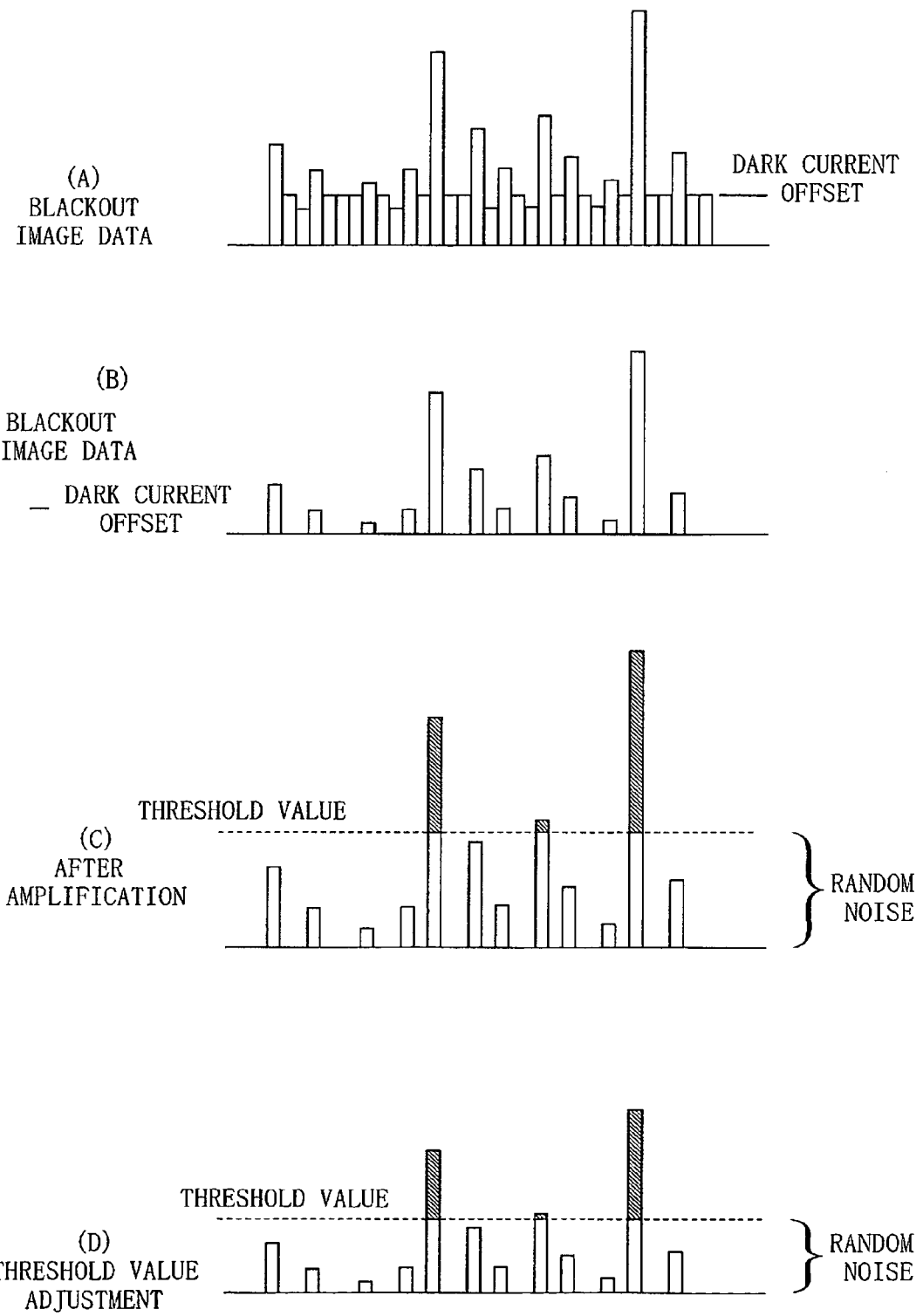
FIGS. 5A to 5D show how to process blackout image data.

FIG. 5A shows the blackout image data generated by the image sensor 114 in that manner.

Step S105: The dark current offset circuit 116 obtains the dark current offset from values of OB pixels of the blackout image data, and subtracts the thus obtained dark current offset from the blackout image data.

FIG. 5B shows the blackout image data from which the dark current offset has been subtracted.

Step S106: The gain setting circuit 122 acquires the charging times Ta and Tb from the control unit 115, determines a gain based on the following expression, and sets the determined gain in the amplification unit 118.

$$\text{Gain}=(T_a/T_b)\cdot\alpha$$

A constant of proportion $\alpha$ is a default gain of the white-spot-on-blackout-image detection circuit 119.

The amplification unit 118 amplifies the blackout image data in accordance with the thus set gain.

FIG. 5C shows the amplified blackout image data.

Step S107: The threshold value setting circuit 132 determines a threshold value RN based on the charging times Ta and Tb and the temperature. The threshold value RN is an upper limit of level variation of a random noise appearing in blackout image data if charging time of that blackout image data is the charging time Ta. The threshold value RN is experimentally obtained.

The random noise appears uniformly in a display screen. On the other hand, the fixed pattern noise like a white spot appears only in a specific pixel in the display screen. From this feature, a last signal level in the case where a predetermined number (e.g., 100) of signal levels are extracted from histogram of signal levels of the blackout image data in descending order of signal level may be determined as the threshold value RN.

The threshold value setting circuit 132 sets the thus determined threshold value RN in the white-spot-on-blackout-image detection circuit 119. The white-spot-on-blackout-image detection circuit 119 performs determination using the thus set threshold value RN for the amplified blackout image data to extract a noise exceeding the threshold value RN.

The address output circuit 120 converts the position of the extracted noise into address information indicating a coordinate on the display screen, and outputs the address information. The address information is temporarily stored in the address storage circuit 121.

Step S108: If the electronic camera 111 is set in a RAW recording mode, the operation is moved to Step S109. Otherwise, the operation is moved to Step S110.

Step S109: The card interface 124 records the image data in the image data storage circuit 117 (i.e., RAW data) and the information indicating the noise position in the address storage circuit 121 into the memory card 125 so that the image data and the information of the noise position are stored to be associated with each other.

It is preferable that data obtained by compressing the coordinate value of the noise position or data obtained by compressing map information indicating the noise position (i.e., mask image) be stored in a predetermined data area within the RAW data.

For the RAW data, it is possible to perform noise reduction based on the noise position in a post-process (i.e., a so-called development process) in a computer.

The electronic camera 111 completes a process for recording the RAW data in this manner.

Step S110: The white-spot-on-blackout-image correction circuit 123 reads out the address information indicating the noise position from the address storage circuit 121. The white-spot-on-blackout-image correction circuit 123 then reads out values of nearby pixels that are located near the noise position from the image data in the image data storage circuit 117 in accordance with the read address information. The white-spot-on-blackout-image correction circuit 123 performs a noise reduction operation (e.g., a weighted average operation or a median operation) for the values of the nearby pixels, thereby generating pixel values after the noise reduction. In a position of high color saturation, it is preferable that the noise reduction operation be performed for nearby pixels of the same color. On the other hand, in a position having low color saturation, it is preferable that the noise reduction operation be performed for both the nearby pixels of the same color and nearby pixels of a different color. Moreover, it is preferable to detect a direction in which pixels resemble each other and to perform the noise reduction operation that improves a contribution ratio of the nearby pixel arranged in that direction.

The white-spot-on-blackout-image correction circuit 123 replaces the pixel value after the noise reduction with a pixel value of the noise position.

The aforementioned processes are performed for each noise position recorded in the address storage circuit 121. As a result, the fixed pattern noise is removed from the image data stored in the image data storage circuit 117.

Step S111: The electronic camera 111 performs color interpolation, color coordinate transformation, and the like process for the image data after the noise reduction. Then, the card interface 124 records and stores the processed image data in the memory card 125.

Principle of Embodiment 2

Main features of the second embodiment are now listed, and the principle of the present embodiment is described for each feature.

(Feature 1)

The blackout image data of the second embodiment also contains the following three noises mainly.

(1) Fixed pattern noise
(2) Random noise
(3) Dark current offset

The dark current offset is close to a direct-current component and can be estimated in a simple manner. For example, the dark current offset can be roughly estimated by obtaining an average signal level of the blackout image data. Alternatively, the dark current offset can be estimated from a condition of the temperature of the image sensor and the charging time, for example. Alternatively, a dummy light-receiving device may be provided in the image sensor to estimate the dark current offset from an output of the dummy light-receiving device.

The noise reduction device removes the dark current offset that can be estimated in the aforementioned manner from the blackout image data. As a result, the fixed pattern noise and the random noise mainly remain in the blackout image data.

The fixed pattern noise increases in approximately proportion to the charging time.

On the other hand, the random noise appears at random and is variable. Thus, an average level of the random noise is not in proportion directly to the charging time (in a case of a complete random noise, for example, the average level of the random noise is in proportion to the square root of the charging time).

Accordingly, with the increase of the charging time, the signal level of the fixed pattern noise moves farther away from that of the random noise. Therefore, it is possible to discriminate the "fixed pattern noise that largely appears locally" from the "random noise that appears with a uniform variation over the display screen" by using an appropriate threshold value set between the signal level of the fixed pattern noise and that of the random noise.

Due to that discrimination, a position of occurrence of the fixed pattern noise (i.e., noise position) can be precisely detected in the second embodiment.

Moreover, in the second embodiment, for the normally taken image data, noise reduction is performed locally at the thus obtained noise position. Thus, a situation where the random noise is added to the image data can be prevented from occurring, unlike the conventional technique. Therefore, it is possible to obtain a good-quality result of the noise reduction.

(Feature 2)

In the second embodiment, the charging time of the blackout image data is shortened. In general, the fixed pattern noise increases approximately in proportion to the charging time. Thus, the fixed pattern noise in the blackout image data becomes smaller in proportion to a shortening ratio of the charging time of the blackout image data. The lowering of level of the fixed pattern noise is compensated by amplifying the blackout image data in the second embodiment. As a result, it is possible to precisely detect the noise position of the fixed pattern noise in the blackout image data even if that blackout image data is generated with a shortened charging time.

Since the charging time of the blackout image data can be flexibly shortened in the aforementioned manner, a time period during which the electronic camera cannot perform imaging can be shortened. Therefore, an electronic camera that has improved usability can be achieved.

(Feature 3)

In the second embodiment, the signal level of the blackout image data is amplified after the dark current offset is subtracted from the signal level of the blackout image data. In this process, the level of the blackout image data before the amplification can be lowered by subtracting the dark current offset from the blackout image data in advance.

Therefore, it is less likely that the signal level of the blackout image data reaches a saturation level due to the amplification, and a level difference between the random noise and the fixed pattern noise can be clearly kept after the amplification. Consequently, it is possible to precisely detect the noise position of the fixed pattern noise without being affected by the saturation of the signal level.

Advantages of Embodiment 2 and Others

Advantages achieved by combining the above features and the like are now described.

As described above, the dark current offset is removed from the blackout image data in the second embodiment. Thus, the fixed pattern noise and the random noise mainly remain in the blackout image data, as shown in FIG. 5B. Then, the determination using the threshold value is performed as shown in FIG. 5C, thereby separating the random noise that falls within a uniform range of variation from the fixed pattern noise that appears locally and detecting the fixed pattern noise.

Especially, when using histogram analysis, it is possible to separate the random noise and the fixed pattern noise from each other in a statistically precise manner. Thus, the fixed pattern noise can be detected even if the level of the fixed pattern noise is small.

Moreover, a condition for varying the random noise, such as the temperature (the temperature of the image sensor, the environmental temperature, or the like) or the imaging sensitivity is detected first, and the threshold value for separating the random noise from the fixed pattern noise is changed in accordance with the detected condition. Thus, the fixed pattern noise can be precisely detected.

By so doing, the fixed pattern noise in the image data can be precisely detected and removed even if the level of that fixed pattern noise is small.

In addition, a waiting time that is required for imaging of the blackout image data can be shortened by shortening the charging time Tb of the blackout image data in the second embodiment. The shortening of the charging time Tb can also be achieved because the precise detection of the fixed pattern noise is possible, as described above.

In the second embodiment, when a RAW recording mode is set, the detected noise position and RAW data are associated with each other and recorded. Thus, noise reduction using the noise position can be performed in a post-process for processing the RAW data.

Furthermore, the data size of the noise position is remarkably smaller than that of the blackout image data. Thus, the recording size of the RAW data is hardly increased even if the information of the noise position is added to the RAW data. Therefore, as compared with a case in which the blackout image data is recorded together with the RAW data, the number of images that can be recorded in a recording medium can be increased.

In the second embodiment, the blackout image data is sequentially processed in a pipeline system, to detect the noise position. Therefore, a memory space for temporarily storing the blackout image data is not required. This can save memory usage.

Next, another embodiment is described.

Embodiment 3

Figure 6:
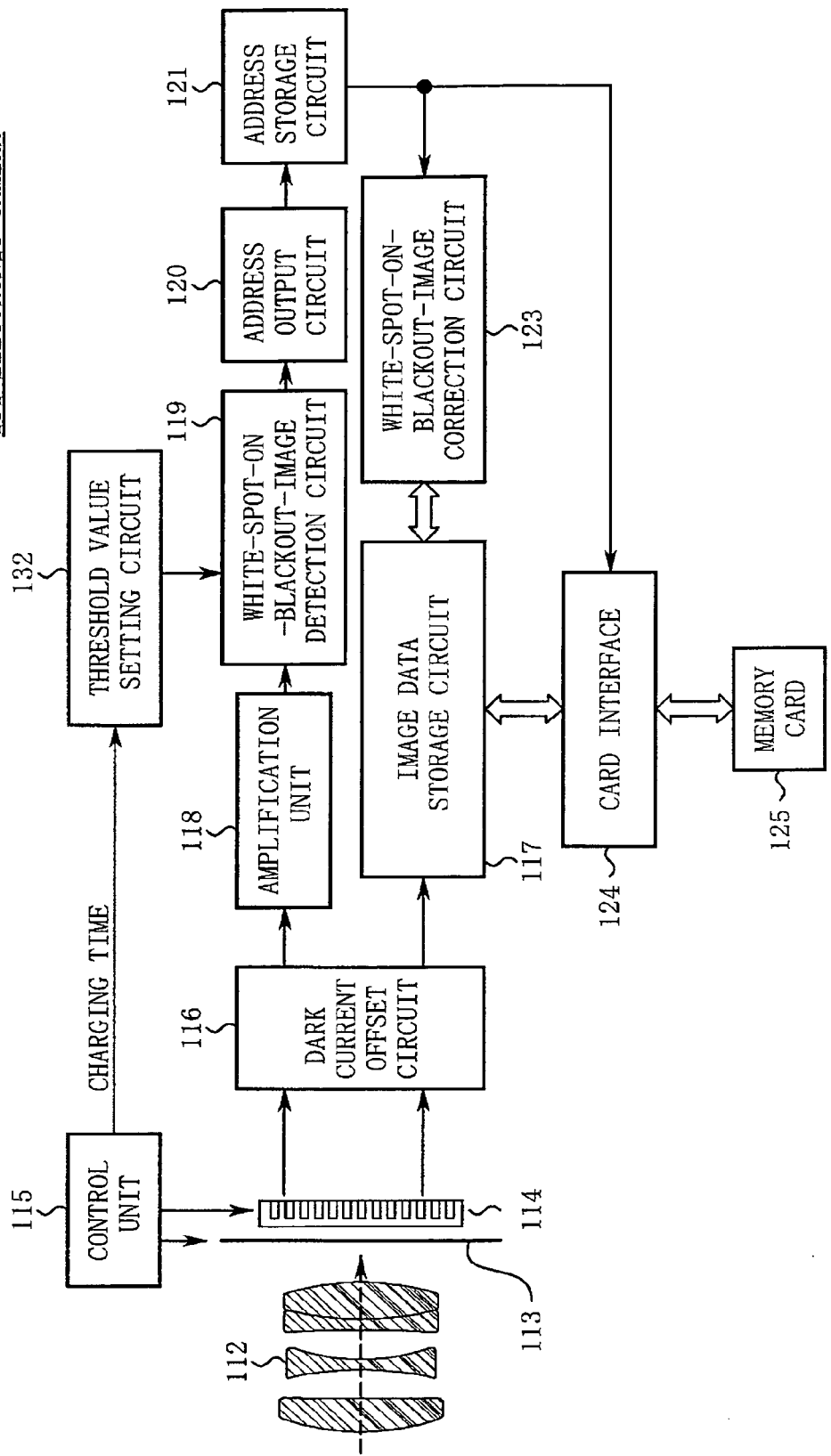
FIG. 6 is a block diagram of an electronic camera 131 according to the third embodiment of the present invention.

FIG. 6 is a block diagram showing the configuration of an electronic camera 131 according to a third embodiment of the present invention.

The configuration of the electronic camera 131 is characterized in that the gain of the amplification unit 118 is fixed to a default gain α and the threshold value of the white-spot-on-blackout-image detection circuit 119 is positively increased or decreased by using the threshold value setting circuit 132. Except for that, the structure of the electronic camera 131 is the same as that in the second embodiment (shown in FIG. 3) and the detailed description is omitted here.

FIG. 7 is a flowchart of a noise reduction process in the electronic camera 131.

This noise reduction process is described, referring to steps in FIG. 7.

Steps S121 to S125: These steps are the same as Steps S101 to S105 in the second embodiment.

Step S126: The threshold value setting circuit 132 acquires the charging times Ta and Tb from the control unit 115, obtains a threshold value that is proportional to the shortening ratio of the charging time in accordance with the following expression, and sets the obtained threshold value in the dark white point detection circuit 119.

$$\text{Threshold value} = RN(Ta/Tb)\beta$$

A constant of proportion $\beta$ is a correction coefficient that is experimentally determined based on subjective estimation of a noise reduction effect. A constant of proportion $RN$ is the default threshold value.

Step S127: The white-spot-on-blackout-image detection circuit 119 performs determination using the thus set threshold value for the blackout image data to extract a noise exceeding the threshold value. The position of the extracted noise is converted into address information in the address output circuit 120. The address information is temporarily stored in the address storage circuit 121.

Step S128 to S131: These steps are the same as Steps S108 to S111 in the second embodiment.

The aforementioned operation can achieve effects that are similar to those in the second embodiment.

In the third embodiment, the charging time of the blackout image data is also shortened. The signal level of the fixed pattern noise is lowered to be approximately proportional to the shortening ratio of the charging time. In order to achieve this, the threshold value is lowered to follow the lowering of the signal level in the third embodiment. As a result, even in the blackout image data for which the charging time has been shortened, the noise position of the fixed pattern noise can be precisely detected.

Since the charging time of the blackout image data can be flexibly shortened in the aforementioned manner, a time period during which the electronic camera 131 cannot perform imaging can be shortened. Thus, the usability of the electronic camera can be improved.

(Supplementation)

A case where noise reduction is performed in the electronic camera is described in the above embodiments. However, the present invention is not limited thereto. For example, a program for performing the noise reduction process shown in FIG. 2, 4 or 7 may be created. In this case, a computer can be operated as the noise reduction device of the present invention by running that noise reduction program on the computer.

Moreover, in an image processing server (e.g., an image album server) on the Internet, the noise reduction method described above may be provided as one type of service for image data and blackout image data that are transmitted from a user.

In the second and third embodiments described above, the determination using the threshold value is performed for detecting the noise position, after the dark current offset is subtracted from the blackout image data. However, the present invention is not limited thereto. For example, the threshold value may be increased by a value corresponding to the dark current offset, instead of subtracting the dark current offset from the blackout image data.

In the second embodiment described above, the amplification is performed after the dark current offset is subtracted from the blackout image data. Thus, a situation where a white spot noise is saturated due to the amplification can be prevented from occurring, and the precise detection of the noise position can be achieved. However, the present invention is not limited thereto. If a nonlinear phenomenon such as saturation does not occur, the blackout image data may be amplified first, and then the dark current offset that is amplified may be subtracted from the amplified blackout image data.

The above embodiments can be implemented by digital signal processing or analog signal processing.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A noise reduction device comprising:
an image storage unit capturing image data obtained by imaging a field with an image sensor and storing the image data therein;
a blackout image processing unit capturing blackout image data obtained by performing the imaging with said image sensor being shaded, and extracting a specific noise component of said blackout image data; and
a noise processing unit reducing a noise in said image data based on said specific noise component of said blackout image data,
wherein:
said blackout image processing unit extracts a value equal to or larger than a predetermined value from said blackout image data as said specific noise component; and
said noise processing unit comprises
a noise detection unit detecting a noise position at which said specific noise component exceeds a predetermined threshold value, and
a noise reduction unit replacing a value of a noise pixel of said image data corresponding to said noise position with a value corresponding to a nearby pixel of said noise pixel to achieve noise reduction.

2. The noise reduction device according to claim 1, wherein
charging time of said blackout image data during imaging is shorter than charging time of said image data during imaging.

3. The noise reduction device according to claim 1, wherein
said blackout image processing unit removes an increase in level caused by a dark current offset from said blackout image data to obtain said specific noise component.

4. The noise reduction device according to claim 1, wherein
said blackout image processing unit discriminates, based on a signal level, a dark current offset from a fixed pattern noise in said blackout image data to obtain said specific noise component containing said fixed pattern noise.

5. The noise reduction device according to claim 1, wherein:
charging time of said blackout image data during imaging is shorter than charging time of said image data during imaging; and
said noise detection unit sets said threshold value to be lower in accordance with a shortening ratio of said charging time of the blackout image data to estimate said noise position, at which the noise becomes visible when said charging time of the blackout image data is extended, from said blackout image data having the shortened charging time.

6. The noise reduction device according to claim 1, wherein:
charging time of said blackout image data during imaging is shorter than charging time of said image data during imaging; and
the noise detection unit amplifies a signal level of said blackout image data in accordance with a shortening ratio of said charging time of the blackout image data to imitate a noise that appears when said charging time of the blackout image data is extended, and performs determination using the threshold value for the amplified blackout image data to estimate said noise position.

7. The noise reduction device according to claim 1, wherein
said noise detection unit amplifies the signal level of said blackout image data after subtracting a dark current offset from said blackout image data.

8. An electronic camera comprising:
the noise reduction device according to claim 1;
an image sensor;
a shading mechanism shading said image sensor; and
a control unit controlling said image sensor to generate image data of a field and driving said shading mechanism to shade said image sensor and generate blackout image data.

9. A noise reduction program making a computer operate as said image storage unit, said blackout image processing unit, and said noise processing unit according to claim 1.

10. A noise reduction method comprising the steps of:
capturing image data obtained by imaging a field with an image sensor and storing the image data, the step being performed by an image storage unit;
capturing blackout image data obtained by performing the imaging with said image sensor being shaded, and extracting a specific noise component of said blackout image data the step being performed by a blackout image processing unit; and
reducing a noise in said image data based on said specific noise component of said blackout image data, the step being performed by a noise processing unit,
wherein:
said blackout image processing unit extracts a value equal to or larger than a predetermined value from said blackout image data as said specific noise component; and
said noise processing unit comprises
a noise detection unit detecting a noise position at which said specific noise component exceeds a predetermined threshold value, and
a noise reduction unit replacing a value of a noise pixel of said image data corresponding to said noise position with a value corresponding to a nearby pixel of said noise pixel to achieve noise reduction.

* * * * *